United States Patent
Landrum et al.

(10) Patent No.: US 10,494,931 B2
(45) Date of Patent: Dec. 3, 2019

(54) INTERNALLY COOLED TURBINE AIRFOIL WITH FLOW DISPLACEMENT FEATURE

(71) Applicant: Siemens Aktiengesellschaft, München (DE)

(72) Inventors: Evan C. Landrum, Charlotte, NC (US); Jan H. Marsh, Orlando, FL (US); Paul A. Sanders, Cullowhee, NC (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 201 days.

(21) Appl. No.: 15/750,310

(22) PCT Filed: Aug. 28, 2015

(86) PCT No.: PCT/US2015/047332
§ 371 (c)(1),
(2) Date: Feb. 5, 2018

(87) PCT Pub. No.: WO2017/039571
PCT Pub. Date: Mar. 9, 2017

(65) Prior Publication Data
US 2018/0238176 A1    Aug. 23, 2018

(51) Int. Cl.
*F01D 5/18* (2006.01)
*F02C 7/18* (2006.01)

(52) U.S. Cl.
CPC ............ *F01D 5/187* (2013.01); *F01D 5/188* (2013.01); *F01D 5/189* (2013.01); *F02C 7/18* (2013.01);
(Continued)

(58) Field of Classification Search
CPC .......... F01D 5/187; F01D 5/189; F01D 5/188; F02C 7/18; F05D 2260/201; F05D 2250/185
(Continued)

(56) References Cited

U.S. PATENT DOCUMENTS 3,902,820 A     9/1975   Amos
5,611,662 A *   3/1997   Cunha ..................... F01D 5/187
                                                      415/115
(Continued)

FOREIGN PATENT DOCUMENTS

EP          1043479 A2      10/2000
EP           990771 A1       4/2004
(Continued)

OTHER PUBLICATIONS

PCT International Search Report and Written Opinion dated May 9, 2016 corresponding to PCT Application PCT/US2015/047332 filed Aug. 28, 2015.

*Primary Examiner* — J. Todd Newton

(57) ABSTRACT

A turbine airfoil (10) includes a flow displacement element (26) occupying a space between a pair of adjacent partition walls (24) in an interior portion (11) of a generally hollow airfoil body (12). The flow displacement element (26) includes an elongated main body (28) extending lengthwise in a radial direction and a pair of connector ribs (32, 34) respectively connecting the main body (28) to pressure and suction sides (16, 18) of the airfoil (10). A pair of adjacent radial flow passes (43-44, 45-46) of symmetrically opposed flow cross-sections are defined on chordally opposite sides of the flow displacement element (26). The radial flow passes (43-44, 45-46) conduct cooling fluid in opposite radial directions and are connected in series via a chordal passage (50a, 50c) defined in the interior portion (11)
(Continued)

between the flow displacement element (26) and a radial end face (52) of the airfoil body (12), to form a serpentine cooling path (60*a*, 60*b*).

16 Claims, 3 Drawing Sheets

(52) U.S. Cl.
 CPC .. *F05D 2250/185* (2013.01); *F05D 2260/201* (2013.01)

(58) Field of Classification Search
 USPC ........................................................ 416/97 R
 See application file for complete search history.

(56) References Cited

U.S. PATENT DOCUMENTS

| | | | | |
|---|---|---|---|---|
| 5,640,767 | A * | 6/1997 | Jackson | B23P 15/04 |
| | | | | 118/427 |
| 6,120,244 | A * | 9/2000 | Fukura | F01D 5/189 |
| | | | | 29/889.72 |
| 7,695,245 | B1 | 4/2010 | Liang | |
| 8,100,654 | B1 * | 1/2012 | Liang | F01D 5/187 |
| | | | | 416/97 R |
| 8,366,391 | B2 * | 2/2013 | Tsukagoshi | F01D 5/16 |
| | | | | 416/233 |
| 2010/0129196 | A1 | 5/2010 | Johnston et al. | |
| 2014/0075947 | A1 * | 3/2014 | Gautschi | F01D 5/189 |
| | | | | 60/726 |
| 2016/0222796 | A1 * | 8/2016 | Spangler | F01D 5/186 |
| 2016/0312632 | A1 * | 10/2016 | Hagan | F01D 9/041 |
| 2017/0030218 | A1 * | 2/2017 | Papple | F01D 5/189 |
| 2017/0044906 | A1 * | 2/2017 | Mongillo | F01D 5/188 |
| 2017/0101893 | A1 * | 4/2017 | Marsh | F01D 5/08 |
| 2017/0248025 | A1 * | 8/2017 | Martin, Jr. | F01D 5/188 |
| 2018/0223676 | A1 * | 8/2018 | Spangler | F01D 5/189 |
| 2018/0230814 | A1 * | 8/2018 | Spangler | F01D 5/187 |
| 2018/0238176 | A1 * | 8/2018 | Landrum | F01D 5/188 |
| 2018/0347466 | A1 * | 12/2018 | Correia | F01D 5/189 |
| 2019/0010809 | A1 * | 1/2019 | Matsuo | F01D 5/18 |
| 2019/0024515 | A1 * | 1/2019 | Marsh | F01D 5/147 |
| 2019/0093487 | A1 * | 3/2019 | Marsh | F01D 5/186 |
| 2019/0101011 | A1 * | 4/2019 | Marsh | F01D 5/186 |
| 2019/0153872 | A1 * | 5/2019 | Oke | F01D 5/187 |
| 2019/0292917 | A1 * | 9/2019 | Sanders | F01D 5/186 |

FOREIGN PATENT DOCUMENTS

| | | |
|---|---|---|
| EP | 2186999 A1 | 5/2010 |
| JP | S5036817 A | 4/1975 |
| JP | S60135605 A | 7/1985 |
| JP | H0828205 A | 1/1996 |
| JP | H10231703 A | 9/1998 |
| WO | 2010131385 A1 | 11/2010 |

* cited by examiner

FIG 2      VIEW II - II

INTERNALLY COOLED TURBINE AIRFOIL WITH FLOW DISPLACEMENT FEATURE

BACKGROUND

1. Field

The present invention is directed generally to turbine airfoils, and more particularly to turbine airfoils having internal cooling channels for conducting a cooling fluid through the airfoil.

2. Description of the Related Art

In a turbomachine, such as a gas turbine engine, air is pressurized in a compressor section and then mixed with fuel and burned in a combustor section to generate hot combustion gases. The hot combustion gases are expanded within a turbine section of the engine where energy is extracted to power the compressor section and to produce useful work, such as turning a generator to produce electricity. The hot combustion gases travel through a series of turbine stages within the turbine section. A turbine stage may include a row of stationary airfoils, i.e., vanes, followed by a row of rotating airfoils, i.e., turbine blades, where the turbine blades extract energy from the hot combustion gases for providing output power. Since the airfoils, i.e., vanes and turbine blades, are directly exposed to the hot combustion gases, they are typically provided with internal cooling channels that conduct a cooling fluid, such as compressor bleed air, through the airfoil.

One type of airfoil extends from a radially inner platform at a root end to a radially outer portion of the airfoil, and includes opposite pressure and suction sidewalls extending span-wise along a radial direction and extending axially from a leading edge to a trailing edge of the airfoil. The cooling channels extend inside the airfoil between the pressure and suction sidewalls and may conduct the cooling fluid in alternating radial directions through the airfoil. The cooling channels remove heat from the pressure sidewall and the suction sidewall and thereby avoid overheating of these parts.

SUMMARY

Briefly, aspects of the present invention provide a turbine airfoil having an internal cooling channel with a flow displacement feature.

Embodiments of the present invention provide a turbine airfoil that comprises a generally hollow airfoil body formed by an outer wall extending span-wise along a radial direction. The outer wall comprises a pressure side and a suction side joined at a leading edge and a trailing edge. A chordal axis is defined extending generally centrally between the pressure side and the suction side.

According to a first aspect of the invention, a turbine airfoil includes a plurality of radially extending partition walls positioned in an interior portion of the airfoil body, connecting the pressure side and the suction side. The partition walls are spaced along the chordal axis. A flow displacement element is positioned to occupy a space between a pair of adjacent partition walls. The flow displacement element comprises an elongated main body extending lengthwise along the radial direction and a pair of connector ribs that respectively connect the main body to the pressure and suction sides along a radial extent. A pair of adjacent radial flow passes of symmetrically opposed flow cross-sections are defined on chordally opposite sides of the flow displacement element. The pair of adjacent radial flow passes conduct a cooling fluid in opposite radial directions and are fluidically connected in series via a chordal flow passage defined in the interior portion between the flow displacement element and a radial end face of the airfoil body, to form a serpentine cooling path.

According to a second aspect of the invention, a turbine airfoil comprises one or more serpentine cooling paths formed in an interior portion of the airfoil body, each comprising at least a pair of adjacent radial flow passes having respective C-shaped flow cross-sections of symmetrically opposed orientations. Each radial flow pass is formed by a first near wall cooling passage adjacent to the suction side, a second near wall cooling passage adjacent to the pressure side, and a central cooling channel connected along a radial extent to the first and second near wall cooling passages. The pair of adjacent radial flow passes conduct a cooling fluid in radially opposite directions and are fluidically connected in series by a chordal flow passage defined in the interior portion of the hollow airfoil body.

According to a third aspect of the invention, a turbine airfoil comprises a plurality of chordally spaced partition walls positioned in an interior portion of the airfoil body, each extending in a radial direction and further extending across the chordal axis along a substantially straight profile connecting the pressure side and the suction side. A flow displacement element is positioned to occupy a space between a pair of adjacent partition walls. The flow displacement element comprises an elongated main body extending lengthwise along the radial direction and a pair of connector ribs that respectively connect the main body to the pressure and suction sides along a radial extent. A pair of adjacent radial flow passes are defined on chordally opposite sides of the flow displacement element. Each radial flow pass is formed by near wall cooling passages defined between the main body and each of the pressure and suction sides and a central cooling channel connecting the near wall cooling passages, the central cooling channel being defined between the main body and a respective one of the adjacent partition walls. The pair of adjacent radial flow passes conduct a cooling fluid in opposite radial directions and are fluidically connected in series via a chordal flow passage defined in the interior portion between the flow displacement element and a radial end face of the airfoil body, to form a serpentine cooling path.

BRIEF DESCRIPTION OF THE DRAWINGS

The invention is shown in more detail by help of figures. The figures show preferred configurations and do not limit the scope of the invention.

DETAILED DESCRIPTION

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Aspects of the present invention relate to an internally cooled turbine airfoil. In a gas turbine engine, coolant supplied to the internal cooling passages in a turbine airfoil often comprises air diverted from a compressor section. Achieving a high cooling efficiency based on the rate of heat transfer is a significant design consideration in order to minimize the volume of coolant air diverted from the compressor for cooling. Many turbine blades and vanes involve a two-wall structure including a pressure side wall and a suction side wall joined at a leading edge and at a trailing edge. Internal passages and cooling circuits are created by employing internal partition walls or ribs which connect the pressure and suction side walls in a direct linear fashion. The present inventors have noted that while the above design provides low thermal stress levels, they may pose limitations on thermal efficiency resulting from increased coolant flow due to their simple forward or aft flowing serpentine-shaped cooling passages and relatively large cross-sectional flow areas.

The embodiments illustrated herein provide a turbine airfoil with internal cooling passages that provide higher thermal efficiencies, without compromising on structural integrity to survive the thermal-mechanical loads experienced during engine operation. Thermal efficiency may be increased by lowering the coolant flow rate. According to the illustrated embodiments, the above is achieved by providing at least one flow displacement element to reduce the cross-sectional flow area of a radial flow of a coolant, thereby increasing convective heat transfer. In a typical two-wall turbine airfoil, a significant portion of the flow in radial flow passes remains toward the center of the flow cross-section between the pressure and suction side walls, and is hence underutilized for convective cooling. Embodiments of the present invention involve providing one or more flow displacement elements that serve to displace the flow in the radial flow passes toward the hot pressure and suction side walls, while also increasing the target wall velocities as a result of the narrowing of the flow cross-section.

Figure 1:
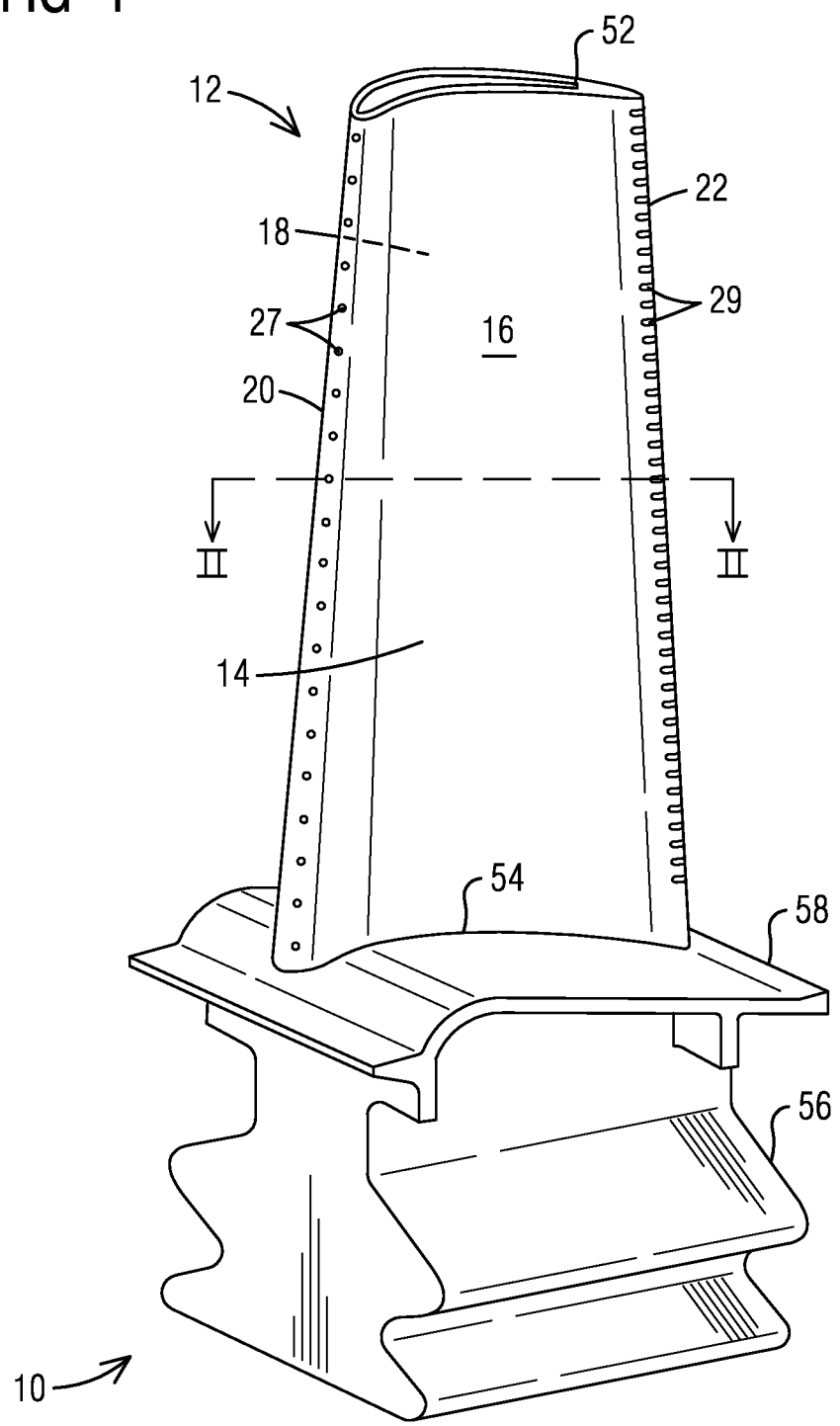
FIG. 1 is a perspective view of an example of a turbine airfoil according to one embodiment.

Referring now to FIG. 1, a turbine airfoil 10 is illustrated according to one embodiment. As illustrated, the airfoil 10 is a turbine blade for a gas turbine engine. It should however be noted that aspects of the invention could additionally be incorporated into stationary vanes in a gas turbine engine. The airfoil 10 may include a generally elongated hollow airfoil body 12 formed from an outer wall 14 adapted for use, for example, in a high pressure stage of an axial flow gas turbine engine. The outer wall 14 extends span-wise along a radial direction of the turbine engine and includes a generally concave shaped pressure side 16 and a generally convex shaped suction side 18. The pressure side 16 and the suction side 18 are joined at a leading edge 20 and at a trailing edge 22. As illustrated, the generally elongated hollow airfoil body 12 may be coupled to a root 56 at a platform 58. The root 56 may couple the turbine airfoil 10 to a disc (not shown) of the turbine engine. The generally hollow airfoil body 12 is delimited in the radial direction by a radially outer end face or airfoil tip 52 and a radially inner end face 54 coupled to the platform 58. In other embodiments, the airfoil 10 may be a stationary turbine vane with a radially inner end face coupled to the inner diameter of the turbine section of the turbine engine and a radially outer end face coupled to the outer diameter of the turbine section of the turbine engine.

Figure 2:
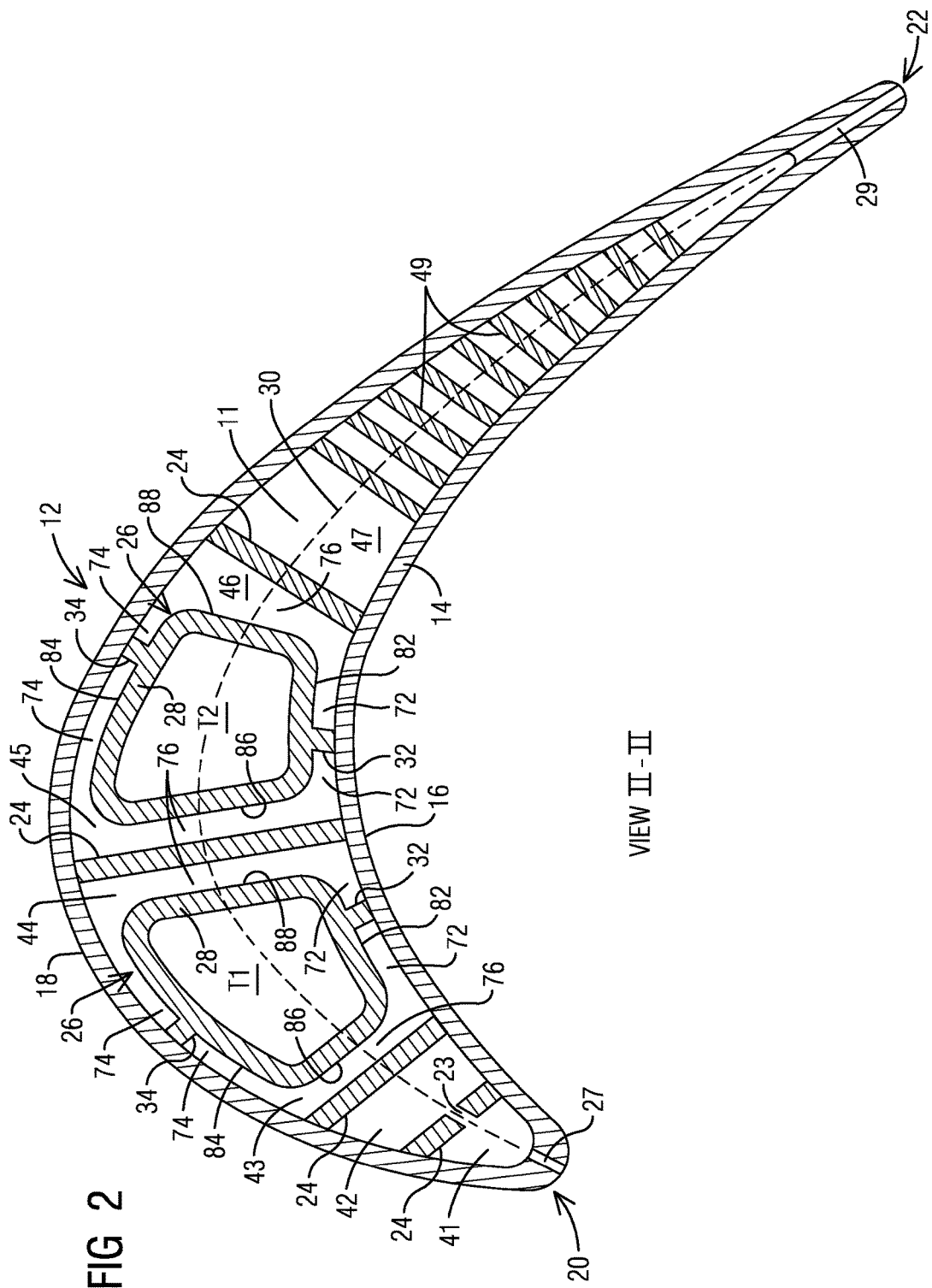
FIG. 2 is a cross-sectional view through the turbine airfoil along the section II-II of FIG. 1, illustrating aspects of the present invention.

Referring to FIG. 2, a chordal axis 30 is defined extending generally centrally between the pressure side 16 and the suction side 18. As illustrated, the generally hollow elongated airfoil body 12 comprises an interior portion 11 which may receive a cooling fluid, such as air from a compressor section (not shown), via one or more cooling fluid supply passages (not shown) through the root 56. A plurality of partition walls 24 are positioned in the interior portion 11 spaced apart chordally, i.e., along the chordal axis 30. The partition walls 24 extend radially, and further extend across the chordal axis 30 connecting the pressure side 16 and the suction side 18 to define radial cavities or flow passes 41-47. The cooling fluid traverses through the flow passes 41-47 and exits the airfoil body 12 via exhaust orifices 27 and 29 positioned along the leading edge 20 and the trailing edge 22 respectively. The exhaust orifices 27 provide film cooling along the leading edge 20 (see FIG. 1). Although not shown in the drawings, film cooling orifices may be provided at multiple locations, including anywhere on the pressure side 16, suction side 18, leading edge 20 and the airfoil tip 52. However, embodiments of the present invention provide enhanced convective heat transfer using low coolant flow, which make it possible to limit film cooling only to the leading edge 20, as shown in FIG. 1.

According to the illustrated embodiment, one or more flow displacement elements 26 may be provided in the interior portion 11 of the airfoil body 12. Each flow displacement element 26 occupies a space between a pair of adjacent partition walls 24 and includes an elongated main body 28 extending lengthwise along the radial direction. In the illustrated embodiment, each main body 28 is hollow, defining a respective inactive cavity T1, T2 within. An inactive cavity may not have any fluid flow through the inactive cavity. For example, each of the inactive cavities T1, T2 may be a dead space that does not include any active flow of fluids, but serve to reduce the cross-sectional area of the radial flow of the cooling fluid and further to displace the cooling fluid toward the pressure side 16 and the suction side 18. Each of the inactive cavities T1, T2 extends radially and is isolated from the outer wall 14. In other embodiments (not shown), one or more of the main bodies 28 may have a solid body construction without any cavities. The generally hollow construction of the main bodies 28 incorporating an inactive cavity T1, T2 within may provide reduced thermal stresses as compared to a solid body construction A pair of connector ribs 32, 34 respectively connect the main body 28 to the pressure and suction sides 16 and 18 along a radial extent. In a preferred embodiment, the flow displacement element 26 may be manufactured integrally with the airfoil body 12 using any manufacturing technique that does not require post manufacturing assembly as in the case of inserts. In one example, the flow displacement element 26 may be cast integrally with the airfoil body 12, for example from a ceramic casting core. Other manufacturing techniques may include, for example, additive manufacturing processes such as 3-D printing. This allows the inventive design to be used for highly contoured airfoils, including 3-D contoured blades and vanes.

The main body 28 may extend across the chordal axis 30, being paced from the pressure and suction sides 16, 18. In the illustrated embodiment, the main body 28 includes first and second opposite side walls 82, 84 that respectively face the pressure and suction sides 16, 18. The first and second side walls 82, 84 may be spaced in a direction generally perpendicular to the chordal axis 30. The main body 28 further comprises forward and aft end walls 86, 88 that may extend between the first and second side walls 82, 84 and may be spaced along the chordal axis 30. In alternate embodiments, the main body 28 may have, for example, a triangular, circular, elliptical, oval, polygonal, or any other shape or outer contour. In the illustrated embodiment, the connector ribs 32, 34 are respectively coupled to the first and second opposite side walls 82, 84. Each flow displacement element 26 including the main body 28 and the connector ribs 32, 34 extends in a radial direction with one of the radial ends terminating within the interior portion 11 of the hollow airfoil body 12 short of a radial end face, in this case the airfoil tip 52, to define a gap. In the illustrated example, the inactive cavities T1, T2 each extend radially outward from a first end 36 located in the root 56 to a second end 38 located in the interior portion 11 of the airfoil body 12, terminating short of the airfoil tip 52. A gap 51 (see FIG. 3) is thereby formed in the interior portion 11 of the airfoil body 12 between the airfoil tip 52 and the respective inactive cavity T1, T2. At least one of the ends 36, 38 of each of the inactive cavities T1, T2 may be closed or capped to ensure that there is no fluid flow through the inactive cavities T1, T2. In one embodiment, the inactive cavities T1, T2, may be closed at the first end 36 at the root 56, while being open at the second end 38. The pressure difference between the inactive cavities T1, T2 and the adjacent flow passes prevent ingestion of the cooling fluid through the open second end 38. Keeping the second end 38 open may be beneficial in reducing internal stresses and stiffening at the tip of the flow displacement element 26. In other embodiments, the inactive cavities T1, T2 may be capped or partially capped at the second end 38 while being closed at the first end 36.

As shown in FIG. 2, a pair of adjacent radial flow passes are defined between adjacent partition walls 24 on opposite sides of each flow displacement element 26 along the chordal axis 30. For example, a first pair of adjacent radial flow passes 43, 44 is defined on chordally opposite sides of a first flow displacement element 26, while a second pair of adjacent radial flow passes 45, 46 is defined on chordally opposite sides of a second flow displacement element 26. Each of the radial flow passes 43-46 is formed by a first near wall cooling passage 72 adjacent to the pressure side 16, a second near wall cooling passage 74 adjacent to the suction side 18, and a central cooling channel 76 connecting the first and second near wall cooling passages 72, 74. The provision of central cooling channel 76 connecting the near wall cooling passages 72, 74 provides reduced stress levels, particularly for rotating airfoils such as turbine blades. In the illustrated embodiment, the first near wall cooling passage 72 is defined between the pressure side 16 and the first side wall 82 of the main body 28. The second near wall cooling passage 74 is defined between the suction side 18 and the second side wall 84 of the main body 28. The central cooling channel 76 is defined between a respective end wall 86, 88 of the main body 28 and a respective one of the adjacent partition walls 24. The first and second near wall cooling passages 72, 74 and the central cooling channel 76 extend along a radial direction, the central cooling channel 76 being connected to the first and second near wall cooling passages 72, 74 along a radial extent.

To provide an effective near wall cooling of the hot outer wall 14, one or more of the first and second near wall cooling passages 72, 74 may have an elongated dimension generally parallel to the chordal axis 30. That is, one or more of the near wall cooling passages 72, 74 may have a length dimension generally parallel to the chordal axis 30 that is greater than a width dimension generally perpendicular to the chordal axis 30. Furthermore, one or more of the central cooling channels 76 may have an elongated dimension generally perpendicular to the chordal axis 30. That is, one or more of the central cooling channels 76 may have a length dimension generally perpendicular to the chordal axis 30 that is greater than a width dimension generally parallel to the chordal axis 30. To this end, the main body 28 may be shaped such that the first and second opposite side walls 82 and 84 are respectively generally parallel to the pressure side 16 and the suction side 18. In the illustrated embodiment, the central cooling channel 76 extends transversely across the chordal axis 30 such that the first and second near wall cooling passages 72 and 74 are located on opposite sides of the chordal axis 30. The illustrated embodiments make it possible to achieve higher Mach numbers even for low coolant flow rates.

As shown, each of the flow passes 43-46 includes a C-shaped flow cross-section, defined by a pair of respective near wall cooling passages 72, 74 and a respective central cooling channel 76. Further, as shown, a pair of adjacent radial flow passes on chordally opposite sides of each flow displacement element 26 have symmetrically opposed flow-cross-sections. In the shown example, the first pair of radial flow passes 43, 44 each have C-shaped flow cross-sections of symmetrically opposed configurations. That is, the flow cross-section of the radial flow pass 44 corresponds to a mirror image of the flow cross-section of the radial flow pass 43, with reference to a mirror axis generally perpendicular to the chordal axis 30. The same description holds for the second pair of radial flow passes 45, 46. It should be noted that the term "symmetrically opposed" in this context is not meant to be limited to an exact dimensional symmetry of the flow cross-sections, which often cannot be achieved especially in highly contoured airfoils. Instead, the term "symmetrically opposed", as used herein, refers to symmetrically opposed relative geometries of the elements that form the flow cross-sections (i.e., the near wall cooling passages 72, 74 and the central cooling channel 76 in this example). The flow passes of the pair 43-44 or 45-46, having symmetrically opposed flow cross-sections, conduct a cooling fluid in opposite radial directions and are fluidically connected via a respective chordal flow passage 50a, 50c, to form a serpentine cooling path, as illustrated in reference to FIG. 3. The chordal flow passages 50a, 50c may be defined within the interior portion 11 of the hollow airfoil body 12 between the flow displacement element 26 and a radial end face, in this case the airfoil tip 52. In the example illustrated in FIG. 3, each chordal flow passage 50a, 50c extends generally parallel to the chordal axis 30, and is defined by the gap 51 between the airfoil tip 52 and a respective inactive cavity T1, T2.

Figure 3:
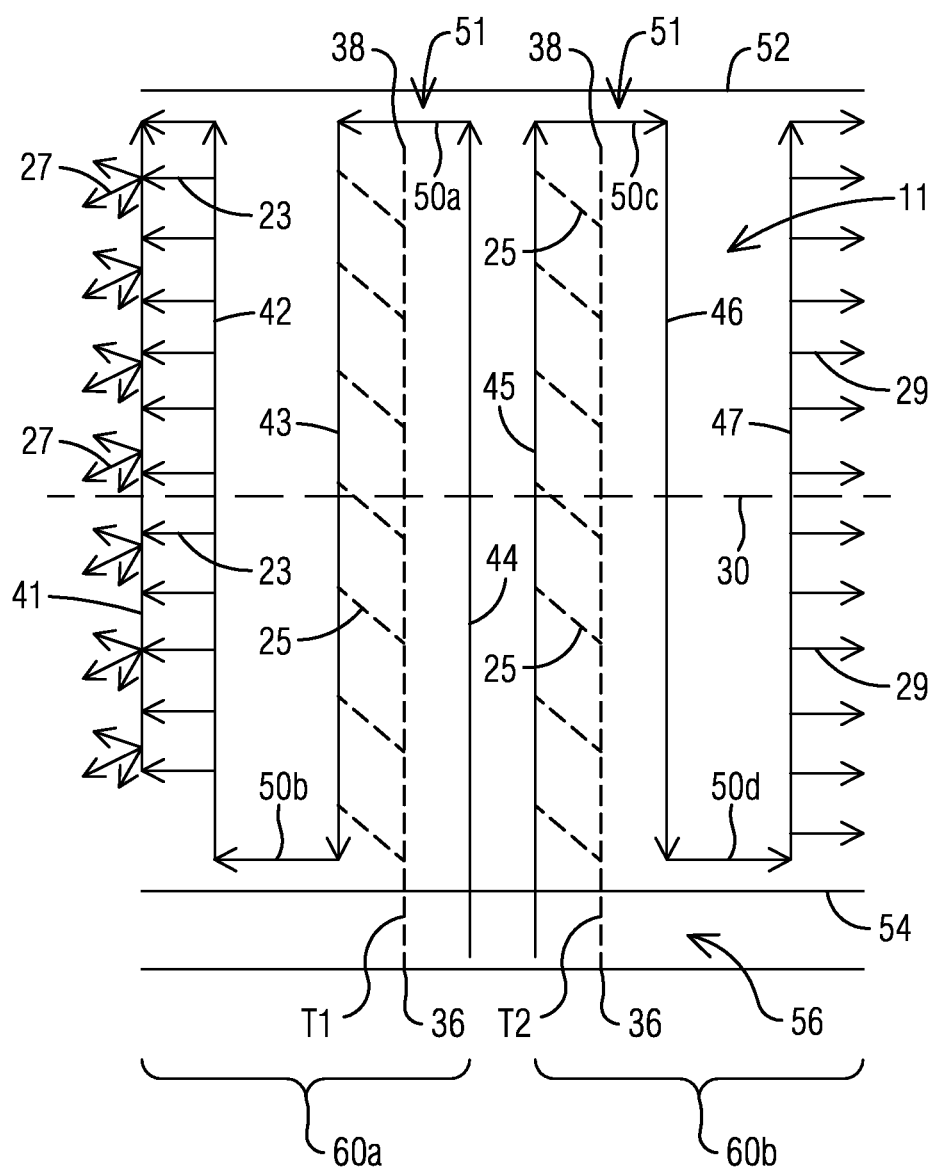
FIG. 3 is a flow diagram illustrating an exemplary serpentine flow scheme through the airfoil according to an embodiment.

Referring now to FIG. 3, an example cooling scheme is illustrated incorporating aspects of the present invention. The illustrated cooling scheme involves two independent and oppositely directed serpentine cooling paths, namely a first serpentine cooling path 60a and a second serpentine cooling path 60b. The first serpentine cooling path 60a begins at the radial flow pass 44 that receives a cooling fluid from a respective cooling fluid supply that may be located at the root 56 of the turbine airfoil 10. The cooling fluid then flows in alternating radial directions through the radial flow passes 44, 43 and 42. The radial flow passes 44, 43 and 42 are connected in series via respective chordal flow passages 50a, 50b to form a serpentine path 60a extending along an aft-to-forward direction along the chordal axis 30. From the radial flow pass 42, the coolant fluid enters a radial cavity 41 via impingement openings 23, and then discharged into the hot gas path via exhaust orifices 27 on the outer wall which collectively form a shower head for cooling the leading edge 20 of the turbine airfoil 10. The second serpentine cooling path 60b begins at the radial flow pass 45 that receives a cooling fluid from a respective cooling fluid supply that may be located at the root 56 of the turbine airfoil 10. The cooling fluid then flows in alternating radial directions through the radial flow passes 45, 46 and 47. The radial flow passes 45, 46 and 47 are connected in series via respective chordal flow passages 50c, 50d to form a serpentine path 60b extending along a forward-to-aft direction along the chordal axis 30. The radial cavity 47 may incorporate trailing edge cooling features 49 (FIG. 2), as known to one skilled in the art, for example, comprising turbulators, or pin fins, or combinations thereof, before being discharged into the hot gas path via exhaust orifices 29 located along the trailing edge 22.

The gap 51 in the interior portion 11 of the hollow airfoil body 12, in cooperation with the symmetrically opposed flow cross-sections of the pair of adjacent radial flow passes 43-44 or 45-46, ensures a uniform flow turn at the chordal passages 50a, 50c from an upstream radial flow pass 44 or 45 to a respective downstream radial flow pass 43 or 46 in the respective serpentine cooling path 60a, 60b. The gap 51 also reduces mechanical stresses experienced by the flow displacement element 26 due to differential thermal expansion with respect to the relatively hot pressure and suction side walls 16 and 18, and further provides convective shelf cooling of the radial end face 52 of the airfoil body 12. The chordal flow passages 50b and 50d may be located for example, in the interior portion 11 of the hollow airfoil body 12, or at the platform 58. For manufacturing support during casting, the inactive cavities T1, T2 may be tied to adjacent active radial flow passes via core ties. Consequently, a plurality of cross-over holes 25 may be formed through each of the main bodies 28 that connect the respective inactive cavity T1, T2 to a respective adjacent radial flow pass 43, 46. In other embodiments, where other manufacturing techniques such as 3-D printing are used to form the inactive cavities T1, T2, or where the main bodies 28 are solid without cavities, the cross-over holes 25 may be obviated.

Referring back to FIG. 2, in the illustrated embodiment, each of the partition walls 24 is a straight rib that extends across the chordal axis 30 along a straight profile connecting the pressure side 16 and the suction side 18. The provision of a partition wall 24 between the inactive cavities T1 and T2 ensures that each of the radial flow passes 43-46 has a C-shaped flow cross-section, with respective first and second pairs of adjacent flow passes 43-44 and 45-46 defined on opposite sides of each flow displacement element 26 having symmetrically opposed flow cross-sections. The absence of a partition wall 24 between the inactive cavities T1, T2 would result in differently shaped (i.e., not symmetrically opposed) flow cross-sections in adjacent radial flow passes. For example, in the shown embodiment, the absence of a partition wall 24 between the inactive cavities T1 and T2 would create a transition from a C-shaped to an I-shaped flow cross-section in the serpentine cooling path, which may give rise to non-uniform flow in the radial flow pass downstream of the transition.

The illustrated embodiments provide a configuration with two inactive cavities T1, T2 separated by a partition wall 24. Aspects of the present invention are not limited to the illustrated embodiments and may be applicable to an airfoil with one or more flow displacement element 26, each having a respective main body 28 defining a respective inactive cavity T1, T2 . . . . For example, in one embodiment, multiple (for e.g., more than two) flow displacement elements 26 may be arranged within the airfoil interior 11, such that the main bodies 28 having the inactive cavities T1, T2 . . . alternate with partition walls 24 along the chordal axis 30, defining one or more serpentine cooling paths in accordance with the inventive concepts described herein. A similar arrangement may be designed with flow displacement elements 26 having solid main bodies 28 without any cavities.

The convective heat transfer provided by the present invention can be further facilitated by additional features known to one skilled in the art. For example, turbulator features, such as turbulator ribs, may be formed on the inner surface of the hot outer wall 14 in the radial flow passes of the serpentine cooling paths. For example, the turbulator ribs can be configured to prevent overcooling at the upstream end of the serpentine cooling paths. In particular, the number and size of the turbulator ribs can be varied along the cooling path, such as by providing an increased turbulator count, and providing larger turbulator ribs, in the downstream direction to increase the heat transfer effect of the turbulator ribs in the downstream direction of the cooling path as the cooling air warms, to thereby enable the heated cooling air to remove an adequate amount of heat from the outer wall in the downstream direction. Additionally, flow guides may be provided, especially in the C-shaped radial flow passes, which optimize the flow distribution in these flow passes and target wall heat transfer. Furthermore, refresher feeds may be incorporated in the serpentine cooling paths. Still further, film cooling holes may be provided on various locations along the serpentine cooling paths for local cooling.

Alternate embodiments may be conceived incorporating aspects of the present invention. For example, in contrast to the above-described embodiments, the main bodies 28 with the inactive cavities T1, T2 may extend radially inward from the airfoil tip 52, terminating short of the radially inner end face 54 of the airfoil body 12. In this case, a pair of symmetrically opposed C-shaped radial flow passes may be fluidically connected by a chordal flow passage defined between the inactive cavity T1, T2 and the radially inner end face 54. In yet another embodiment, the inactive cavities T1 and T2 may be staggered radially such that one of the inactive cavities T1 terminates short of the airfoil tip 52, while the other inactive cavity T2 terminates short of the radially inner end face 54 to define respective chordal passages therebetween. An exemplary cooling scheme in such a case may include a single serpentine cooling path, which may extend either in a forward-to-aft or an aft-to-forward direction, wherein all of the radial flow passes 43-46 may be fluidically connected in series. A similar scheme may be designed with flow displacement elements 26 having solid main bodies 28 without any cavities.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A turbine airfoil comprising:
   a generally hollow airfoil body formed by an outer wall extending span-wise along a radial direction, the outer wall comprising a pressure side and a suction side joined at a leading edge and a trailing edge, wherein a chordal axis is defined extending generally centrally between the pressure side and the suction side,
   a plurality of radially extending partition walls positioned in an interior portion of the airfoil body and connecting the pressure side and the suction side, the partition walls being spaced along the chordal axis, and a flow displacement element positioned to occupy a space between a pair of adjacent partition walls and comprising an elongated main body extending lengthwise along the radial direction and a pair of connector ribs that respectively connect the main body to the pressure and suction sides along a radial extent, whereby a pair of adjacent radial flow passes of symmetrically opposed flow cross-sections are defined on chordally opposite sides of the flow displacement element, wherein the pair of adjacent radial flow passes conduct a cooling fluid in opposite radial directions and are fluidically connected in series via a chordal flow passage defined in the interior portion between the flow displacement element and a radial end face of the airfoil body, to form a serpentine cooling path.

2. The turbine airfoil according to claim 1, wherein the main body is hollow, defining an inactive cavity isolated from the outer wall and extending in a radial direction from a first end to a second end, terminating short of the radial end face of the airfoil body at the second end, to define a gap that forms the chordal flow passage.

3. The turbine airfoil according to claim 2, wherein the inactive cavity is closed at the first end.

4. The turbine airfoil according to claim 2, wherein the radial end face comprises a radially outer airfoil tip, and wherein the first end of the inactive cavity is located at a root portion of the turbine airfoil.

5. The turbine airfoil according to claim 1, wherein each radial flow pass is formed by near wall cooling passages defined between the main body and each of the pressure and suction sides and a central cooling channel connecting the near wall cooling passages, the central cooling channel being defined between the main body and a respective one of the adjacent partition walls.

6. The turbine airfoil according to claim 5, wherein each radial flow pass has a C-shaped flow cross-section defined by the respective near wall cooling passages and the respective central cooling channel.

7. The turbine airfoil according to claim 5, wherein the near wall cooling passages are positioned on opposite sides of the chordal axis.

8. The turbine airfoil according to claim 5, wherein one or more of the near wall cooling passages have an elongated dimension generally parallel to the chordal axis, and wherein the central cooling channel has an elongated dimension generally perpendicular to the chordal axis.

9. The turbine airfoil according to claim 1, wherein the main body comprises:

first and second opposite side walls facing the pressure and suction sides respectively, and forward and aft end walls that extend between the first and second side walls, wherein the flow in the serpentine cooling path passes sequentially along the end walls.

10. The turbine airfoil according to claim 9, wherein the first and second opposite side walls are generally parallel to the pressure side and the suction side respectively.

11. The turbine airfoil according to claim 1, wherein the flow displacement element is manufactured integrally with the airfoil body.

12. The airfoil according to claim 1, wherein each of the adjacent partition walls extends across the chordal axis along a substantially straight profile connecting the pressure and suction sides.

13. The turbine airfoil according to claim 1, comprising a plurality of flow displacement elements each comprising a respective main body, the flow displacement elements being arranged such that the main bodies alternate with the partition walls along the chordal axis.

14. The turbine airfoil according to claim 13, wherein a first pair of adjacent radial flow passes on chordally opposite sides of a first flow displacement element form an aft-to-forward serpentine cooling path along the chordal axis, and a second pair of adjacent radial flow passes on chordally opposite sides of a second flow displacement element form a forward-to-aft serpentine cooling path along the chordal axis.

15. A turbine airfoil comprising:

a generally hollow airfoil body formed by an outer wall extending span-wise along a radial direction and being delimited at a radially outer end by an airfoil tip, the outer wall comprising a pressure side and a suction side joined at a leading edge and a trailing edge, wherein a chordal axis is defined extending generally centrally between the pressure side and the suction side, a plurality of chordally spaced partition walls positioned in an interior portion of the airfoil body, each extending in a radial direction and further extending across the chordal axis along a substantially straight profile connecting the pressure side and the suction side, and a flow displacement element positioned to occupy a space between a pair of adjacent partition walls and comprising an elongated main body extending lengthwise in the radial direction and a pair of connector ribs that respectively connect the main body to the pressure and suction sides along a radial extent, wherein a pair of adjacent radial flow passes are defined on chordally opposite sides of the flow displacement element, wherein each radial flow pass is formed by near wall cooling passages defined between the main body and each of the pressure and suction sides and a central cooling channel connecting the near wall cooling passages, the central cooling channel being defined between the main body and a respective one of the adjacent partition walls, and wherein the pair of adjacent radial flow passes conduct a cooling fluid in opposite radial directions and are fluidically connected in series via a chordal flow passage defined in the interior portion between the flow displacement element and the airfoil tip, to form a serpentine cooling path.

16. The turbine airfoil according to claim 15, wherein the main body is hollow, defining an inactive cavity isolated from the outer wall and extending in a radial direction from a first end to a second end, terminating short of the radial end face of the airfoil body at the second end to define a gap that forms the chordal flow passage.

* * * * *